United States Patent [19]

Aizaki

[11] Patent Number: 4,638,434
[45] Date of Patent: Jan. 20, 1987

[54] CASH PROCESSING SYSTEM

[75] Inventor: Yoshihiko Aizaki, Kawasaki, Japan

[73] Assignee: Fujitsu Limited, Kanagawa, Japan

[21] Appl. No.: 676,990

[22] Filed: Nov. 30, 1984

[30] Foreign Application Priority Data

Nov. 30, 1983 [JP] Japan ................. 58-225692
Nov. 30, 1983 [JP] Japan ................. 58-225694

[51] Int. Cl.⁴ .............. G06F 15/22; G06F 15/20; G06F 15/30
[52] U.S. Cl. ............... 364/401; 364/478; 235/133 R; 235/379
[58] Field of Search ........... 364/478, 401, 405, 408; 271/306, 207, 213, 3, 3.1, 478, 479; 406/186, 184, 185; 235/478, 479, 133 R, 379; 340/825.34, 825.35; 414/43

[56] References Cited

U.S. PATENT DOCUMENTS 3,949,364  4/1976  Clark et al. ............ 340/825.34
3,956,615  5/1976  Anderson et al. .......... 235/379
4,552,350  11/1985  Nagy et al. ............ 271/3.1 X
4,552,351  11/1985  Tsukamoto ............ 271/3.1
4,578,009  3/1986  Granzow et al. .......... 414/43

*Primary Examiner*—Jerry Smith
*Assistant Examiner*—Charles B. Meyer
*Attorney, Agent, or Firm*—Armstrong, Nikaido, Marmelstein & Kubovcik

[57] ABSTRACT

A cash processing system comprises: a transaction terminal having an opening for taking out and putting in a cash, and means for demanding payment or receipt of the cash; cashier terminal which is provided separately from the transaction terminal to effect the payment and receipt of the cash; a passage for connecting the transaction terminal and the cashier terminal; a carriage capable of moving along and on the passage for conveying the cash between the terminals; a system controller for controlling the receipt and payment of the cash; and a conveyance controller for controlling the conveyance of the cash.

19 Claims, 20 Drawing Figures

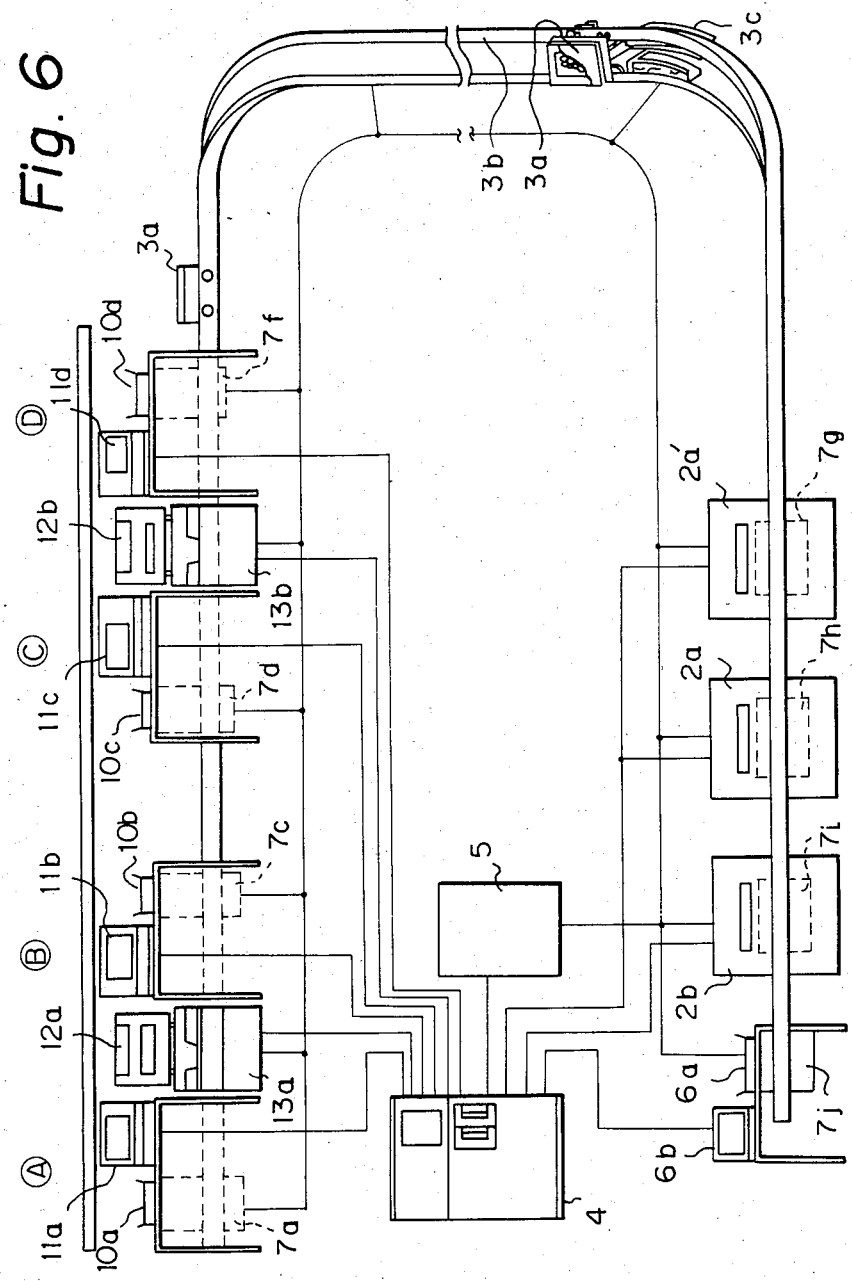

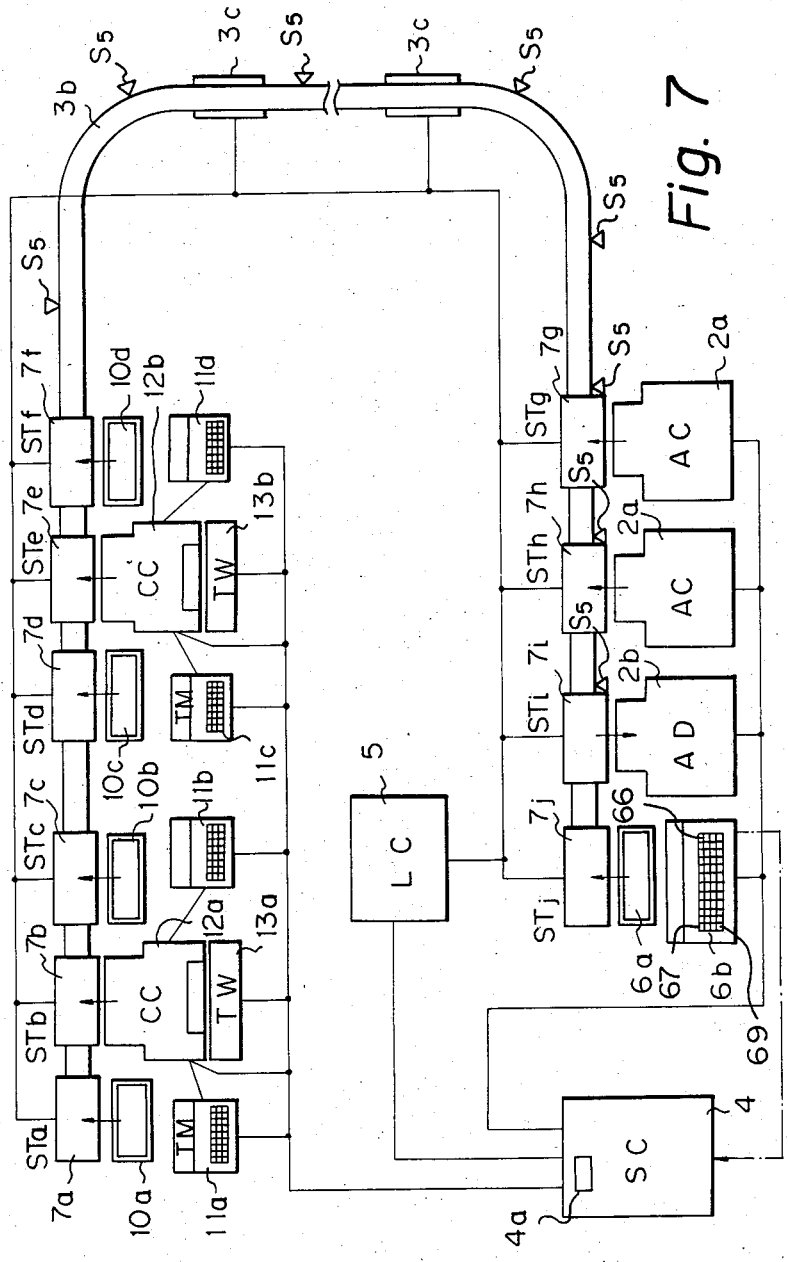

Fig. 14A
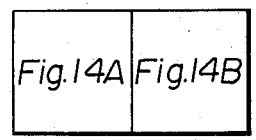
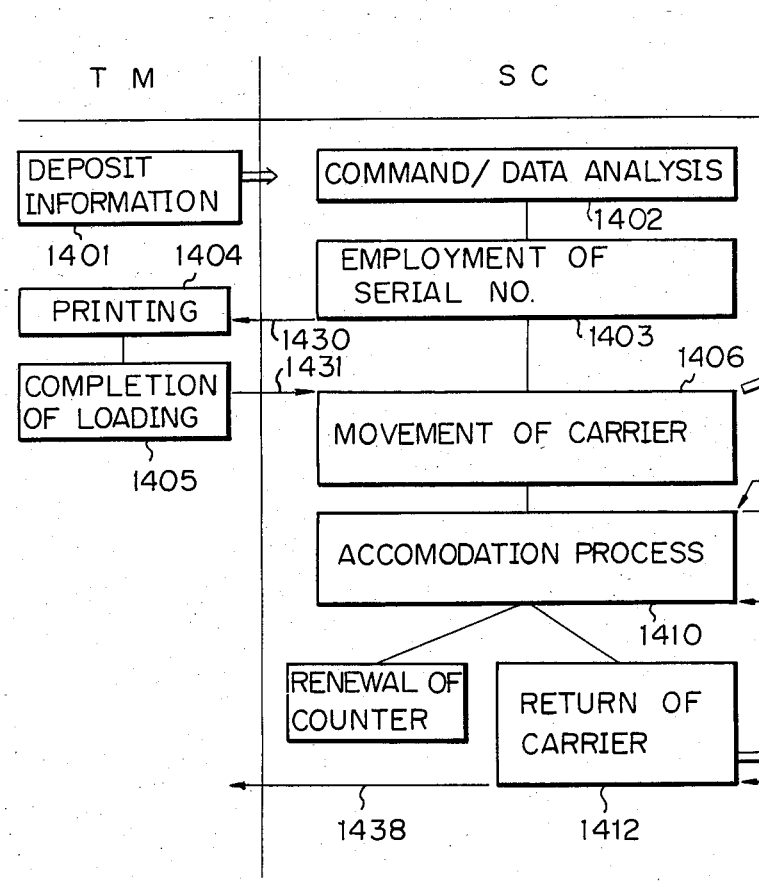

CASH PROCESSING SYSTEM

BACKGROUND OF THE INVENTION

1. Field of the Invention

The present invention relates to a cash processing system in which a tellers window at a counter and a cashier machine are connected together via carrier means in a money-handling organization such as a bank or the like.

2. Description of the Related Art

In recent years, remarkable developments in the field of office automation have enabled many and various types of work to be carried out automatically. In organizations where large amounts of cash are handled, e.g., banks, there is a strong trend toward the adoption of office automation to further enhance the reliability of the handling of cash. For this purpose, an automatic cash disbursing machine and an automatic depositing machine have been developed and are already in use in such organizations, to automatically carry out the work of handling the cash. In a bank, these automatic machines are installed at places separate from the ordinary wickets (tellers' windows), and are used exclusively for depositing or withdrawing cash from an account by using a cash card.

However, in the cash processing system of the prior art as mentioned above, since the control of the cash discrimination, cash counting, cash accommodation, and cash carriage from the tellers windows to a cash box or vice versa are sequential, if these operations are demanded from a plurality of tellers at the same time, they cannot be effected simultaneously. This results in the customers being kept waiting for long periods of time. Furthermore, when the cash box becomes full and must be exchanged for an empty one, the automatic cash receiving or disbursing system line must be temporarily stopped. In addition, when a clearance operation is required, according to the cash processing system of the prior art, such a clearance operation cannot be effected in parallel with the transactions for the receipt or disbursement of the cash. To overcome these problems, and to promote the automation of cash handling at the teller's windows, there has arisen a strong demand for an automatic cash processing system operating between the teller's windows and the cash box.

SUMMARY OF THE INVENTION

The primary object of the present invention is to solve the aforementioned problems of the prior art by providing a cash processing system having a simplified control system for cash receipt and/or cash payment. Another object of the present invention is to provide a cash processing system in which details of an operation such as cash receipt of cash disbursement can be temporarily held in the control device to enable the cash boxes to be exchanged.

Still another object of the present invention is to provide a cash processing system in which a clearance can be effected in parallel with other cash transactions.

In order to achieve the above objects, according to the present invention, there is provided a cash processing system including a transaction terminal having opening means for taking out and putting in cash, and means for demanding the payment or receipt of cash, a cashier terminal provided separately from the transaction terminal to effect the payment and receipt of cash, passage means for connecting the transaction terminal and the cashier terminal, carriage means capable of moving along and on the passage means for conveying cash between the transaction and cashier terminals, and vice versa, a system controller for controlling the receipt and payment of cash by the cashier terminal, in response to a demand from the transaction terminal, and a conveyance controller for controlling the conveyance of cash by the carriage means in accordance with signals output from the system controller.

According to another aspect of the present invention, there is provided a cash processing system including a teller's window terminal having an outlet opening for taking out cash and input means for inputting a demand including a cash payment amount, a paying-in terminal having a cash box for receiving cash, and means for feeding cash from the cash box into passage means between the teller's window terminal and the payment terminal for connecting the terminals, carriage means capable of moving along and on the passage means for conveying cash fed from the payment terminal to the teller's window terminal, a system controller for issuing a signal for feeding cash to the payment terminal, in response to a demand from the teller's window terminal and for issuing a signal for movement of the carriage means located in the associated teller's window terminal to the payment terminal, and a conveyance controller for conveying the carriage means of the associated teller's window terminal to the payment terminal, in response to signals output by the system controller, the conveyance of the movement of the carriage means between the teller's window terminal and the payment terminal being able to move abreast of cash fed by the payment terminal.

According to still another aspect of the present invention, there is provided a cash processing system including a teller's window terminal having a cash putting in opening, cash counting means for counting cash put in through the cash putting in opening, and loading means for automatically loading cash counted by the counting means onto a carriage for conveying the cash, a receiving terminal for receiving cash loaded on the carriage, a passage means between the teller's window terminal and the receiving terminal for the movement of the carriage, a system controller for stopping the receipt transaction at the teller's window terminal, in response to the completion of loading of cash onto the carriage at the teller's window terminal, and for demanding the commencement of the movement of the carriage at the associated teller's window terminal, and a conveyance controller for conveying the carriage at the teller's terminal to the receiving terminal, in response to the demand to the system controller.

BRIEF DESCRIPTION OF THE DRAWINGS

FIG. 6 is a schematic diagram of the whole structure of an embodiment of the present invention;

FIG. 7 is a top view of the structure of FIG. 6;

DESCRIPTION OF THE PREFERRED EMBODIMENTS

Figure 1:
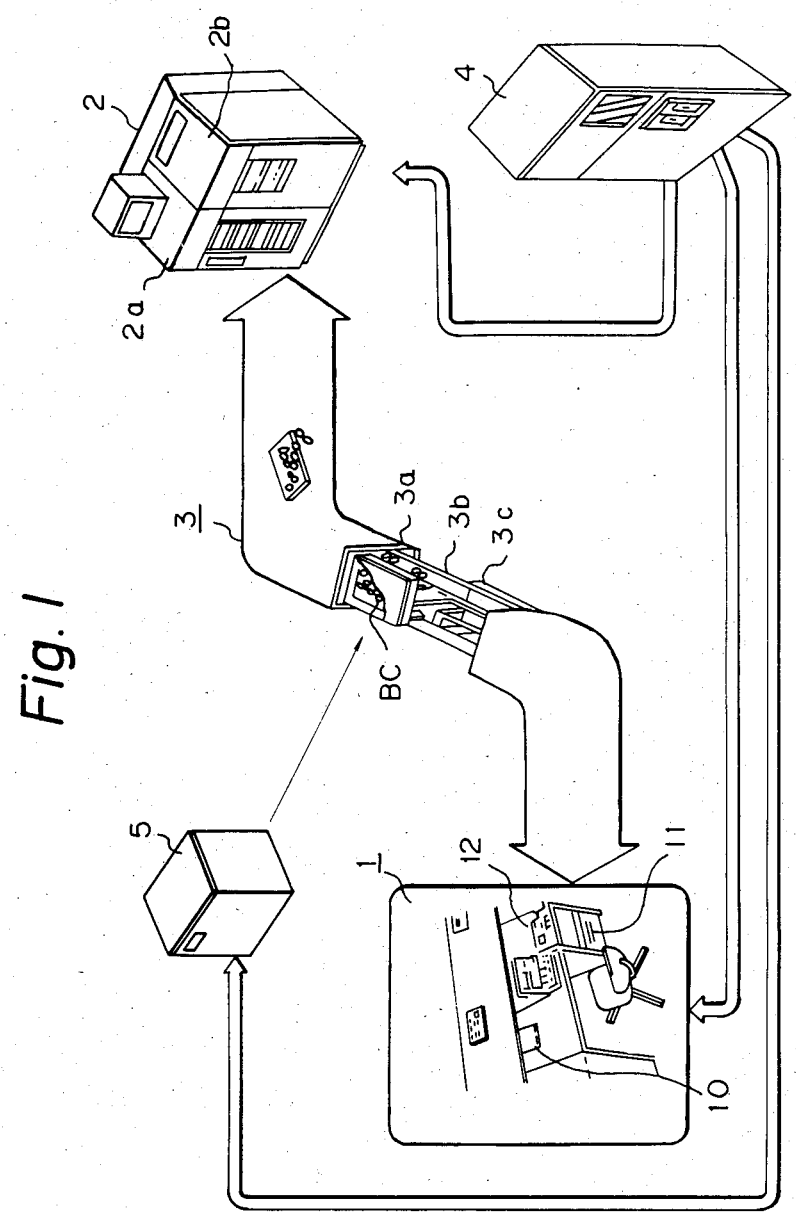
FIG. 1 is a schematic diagram of a system for processing cash according to the present invention.

In the cash processing system shown in FIG. 1, a wicket counter (teller's window counter) 1 and a cashier machine 2 are connected together through a carrier device 3.

The wicket counter 1 is equipped with a cash handling port 10, a teller terminal 11, and a cash receiving machine 12 for the teller. These units 1, 10, 11, and 12 constitute a transaction terminal.

The cashier machine 2 has an automatic cash discharging machine 2a and an automatic cash accomodating machine 2b.

The carrier device 3 includes rails 3b that connect the cashier machine 2 to the wicket counter 1, and a linear motor car which has a carrier 3a that moves on the rails 3b and a stator 3c that drives the carrier 3a.

The operation of the above are controlled by a control unit (system controller) 4, and the carrier device 3 is further controlled by a linear motor controller (carriage controller) 5.

In the transaction terminal, the cash receiving operation is carried out as described below. That is, the cash, etc. which the teller has received from a customer at the wicket counter 1 is put into the cash handling port 10, and directly placed on the carrier 3a. The amount of cash, etc. is then input at the teller terminal 11. Under the control of the control unit 4 and the linear motor controller 5, the carrier 3a in the wicket counter 1 is driven on the rail 3b to the cashier machine 2, and the cash placed on the carrier 3a is held in the safe in the automatic cash accomodating machine 2b. This operation also can be carried out through the teller's cash receiving machine 12. In this case, the teller's cash receiving machine 12 discriminates the cash and confirms the amount of cash received; the cash is then placed on the carrier 3a.

The cash disbursing operation is carried out as described below. That is, as the teller inputs the disbursing instruction and the disbursement amount from the teller termrinal 11 to the control unit 4, the carrier 3a in the wicket counter 1 is driven on the rail 3b to the automatic cash discharging machine 2a. The amount of cash discharged from the cash box of the automatic cash discharging machine 2a is placed on the carrier 3a, which then moves alone the rail 3b to the wicket counter 1. The teller then takes out the cash through the cash handling port 10.

According to the above-mentioned cash processing system, the cash is transferred between the cash box and the wicket without the need for manual handling, making it possible to alleviate the amount of work at the wicket, to control the cash in a uniform manner, and to contribute to the prevention of crime. Therefore, the cash processing system of the present invention can be very effectively adopted to the work of handling cash.

In the conventional automatic cash processing system, the cash discrimination and counting, cash carriage, and cash holding in the cash receiving operation, or the cash disbursement and cash carriage in the cash disbursing operation, are controlled by the same single control block, and accordingly, the control is rather complex. Therefore, when cash discrimination and counting are demanded from a plurality of tellers' windows simultaneously, the processing thereof must be made sequentially, with the result that it is impossible to effect those demands at the same time.

Furthermore, as mentioned before, in the processing system of the prior art, when a full cash box must be exchanged for an empty one, the entire system must be temporarily stopped. In addition, during cash receiving and disbursing transactions, the sum of the incomings or outgoings are stored in a cash counter in the control device 4, and is renewed when the cash receiving or cash disbursing transaction is completed. Meanwhile, during these transactions, a clearance operation is effected to confirm the amount of transactions per one day or per a certain period of time. This clearance operation is effected by means of a cashier console (not shown) associated with the control device, and the receiving or paying transactions are stopped so that a minute examination note can be issued in accordance with the content of the cash counter and the cash counter is then cleared.

The cash box at the cash accomodating machine 2b is taken out and the amount of cash in the box is compared with amount shown on the examination note, so that if the identity is confirmd, the operation is concluded as a no-error operation. As can be understood from the above, since the clearance operation is effected independently of the transactions at the tellers counter, the demand for a clearance operation may be issued during a cash receiving or disbursing operation. In this case, in the conventional processing system as mentioned above, there is a possibility that the amount of cash in that transaction is not counted at the cash counter or the clearance operation is effected during the carriage of the cash, thus resulting in an inconsistency between the cash in the cash box and the amount on the examination note, or in a failure to include the amount of cash in the transaction which should be included in the counted amount of cash.

According to the significant feature of the present invention, the carriage controller (linear motor controller) 5 is provided separately from the system controller (control unit) 4.

Figure 2:
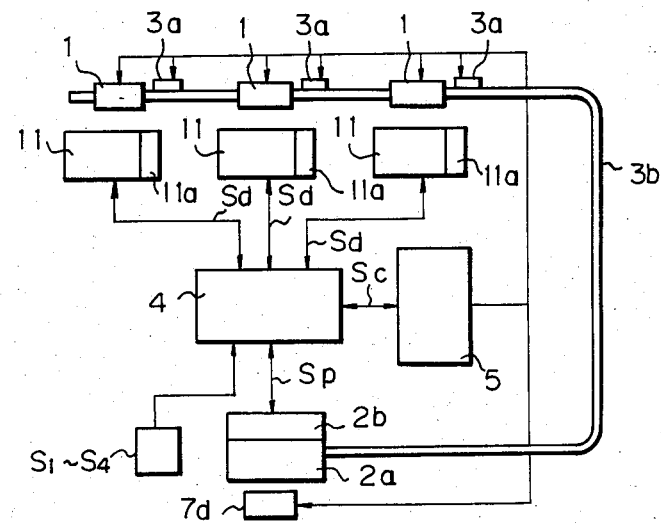
FIG. 2 is a schematic diagram of a cash disbursing system according to an embodiment of the present invention.

FIG. 2 is a block diagram of a simple arrangement of an embodiment of a cash disbursing system of the present invention, in which a plurality of tellers terminals are arranged.

In FIG. 2, the system controller 4 controls the automatic cash discharging machine 2a and the carriage controller 5. The system controller 4 actuates the cash discharging machine 2a in response to a demand for payment from the tellers terminals 11, operates the carriage controller 5 at a predetermined time, and counts and stores in a memory the sum of the payments for each of the tellers terminals 11 and the total of the sum of all the tellers terminals.

The term "at the predetermined time" referred to above is that time from the commencement of the actuation of the cash discharging machine 2b to the determination that the requested amount of cash is loaded on a selected carrier 3a, and that no carrier other than the selected carrier is on the rail 3b of the carriage device.

The carriage controller 6 controls the carriage of the carriers 3a to move along the rail 3b between the tellers counters 1 and the cash disbursing station, i.e., the cash discharging machine 2a. The tellers stations, i.e., the tellers counters 1, are provided corresponding to the tellers terminals 11 where the corresponding carriers 3a are located and wait.

Cash discharging station 7d is located at the start point of the conveyance passage, i.e., the rail 3b, corresponding to the cash discharging machine 2a, so that the discharged cash is loaded on the associated carrier 3a.

The carriers 3a convey the cash loaded thereon between the cash disbursing station 7d and the tellers counters 1, as will be described hereinafter.

The details of the construction of the stations and machines in the arrangement in FIG. 2 will be described later.

Assuming that the leftmost tellers counter 1 in FIG. 2 has issued a demand for payment, then the payment of the cash will be effected as follows (see FIG. 3).

Figure 3:
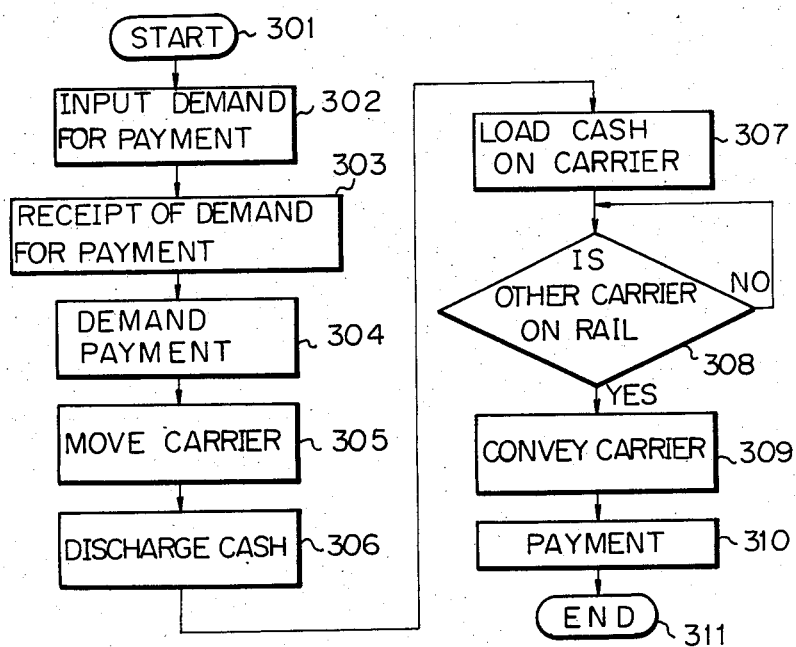
FIG. 3 is a flowchart of the operation for carrying out cash disbursement in the arrangement shown in FIG. 2.

In FIG. 3, at step 301, the operation starts. The tellers terminal 11 inputs the demand for payment at step 302. The demand signal Sd is fed to the system controller 4 at step 303. The system controller 4 issues the signal Sp for payment to the cash accomodating machine 2b and the cash discharging machine 2a at step 304, and also issues a signal Sc to the carriage controller 5 so that the latter causes the associated carrier 3a waiting at the tellers counter 1 to move to the cash disbursing station 7d at step 305.

The cash discharging machine 2a operates to discharge the requested amount of cash from the cash accommodating machine 2b at step 306, and the discharged cash is then loaded on the carrier 3a at step 307.

The system controller 4 detects that no other carrier 3a is on the rail 3b at step 308 and then causes the carriage controller 5 to move the carrier having the cash to the tellers terminal 11, and accordingly, tellers counter 1 at step 309. The cash conveyed to the tellers counter is checked and confirmed by the teller that it conforms with the requested amount of money by means of a cash counter 11a provided in the tellers temrinal. The cash is then delivered to the customer at step 310.

Figure 4:
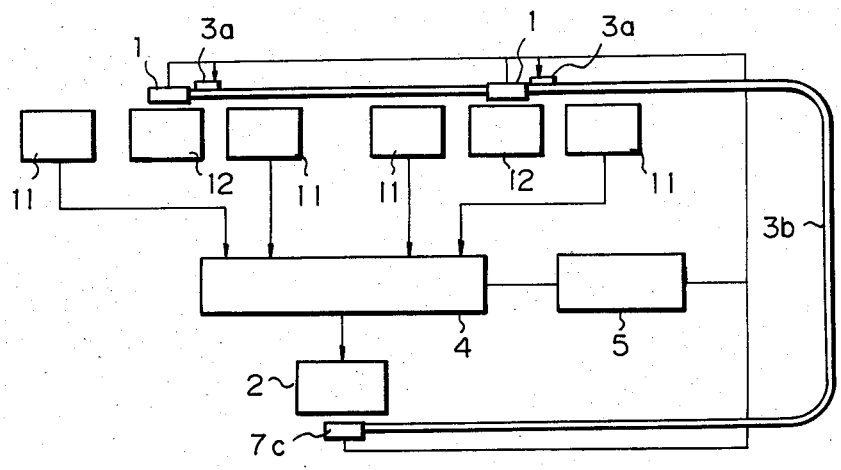
FIG. 4 is a schematic view of a cash receiving and holding system according to an embodiment of the present invention.

FIG. 4 shows an simple arrangement of an embodiment of the present invention for carrying out cash receipt transactions. In the arrangement illustrated in FIG. 4, the tellers counters 1 and the cash receiving machines 12 are provided for every two tellers terminals 11. The cash box 2 is separate from the cash receiving machines 12. The reference 7c designates the cash accomodating station which corresponds to the cash discharging station 7d in FIG. 2. The details of the cash receiving machines 12 will be described hereinafter.

The cash receiving operation in FIG. 4 is carried out as follows.

Figure 5:
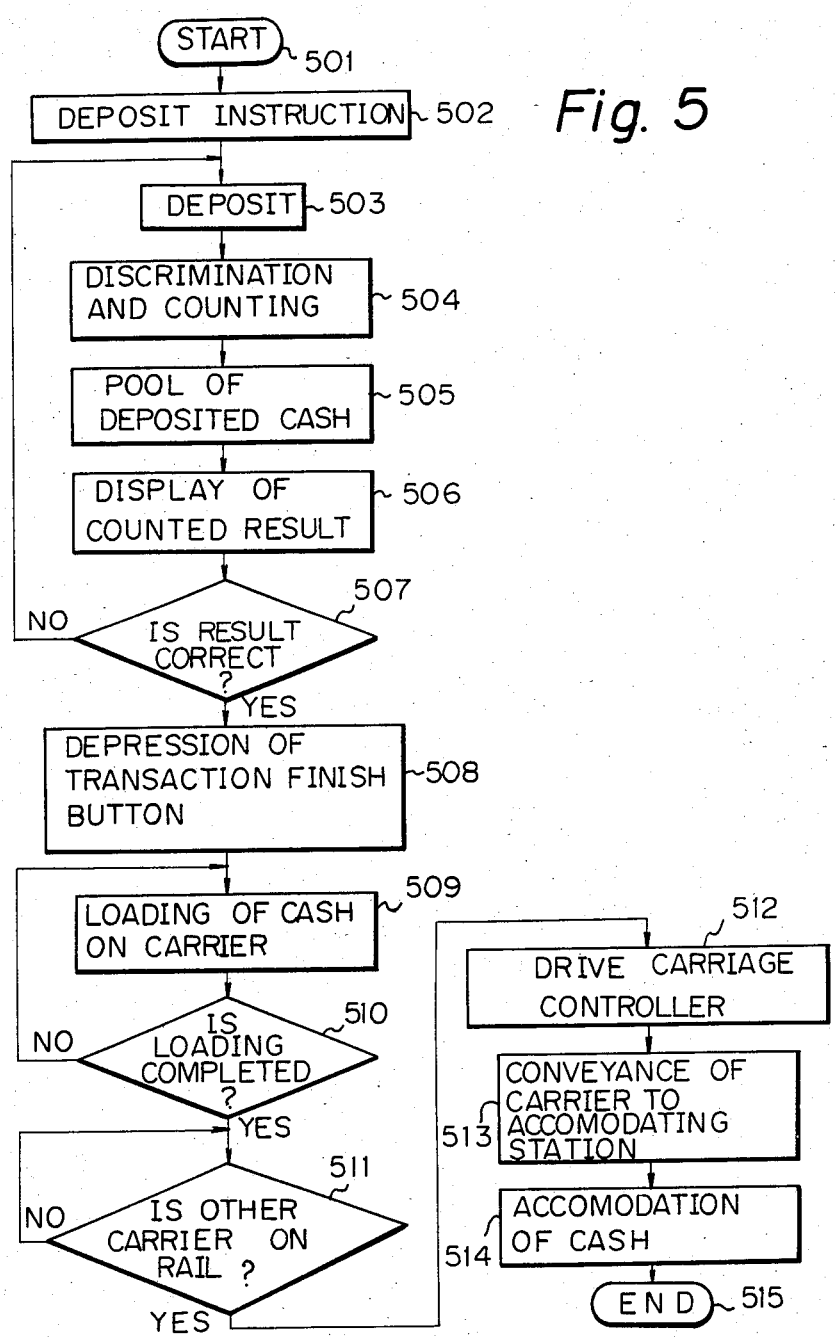
FIG. 5 is a flowchart of the operation for carrying out the receipt and holding of cash in the arrangement shown in FIG. 4.

Described below is the case when the cash is to be deposited according to a deposit instruction from the leftmost tellers terminal 11 in FIG. 4, in conjunction with the flowchart given in FIG. 5.

The operation starts at step 501. At step 502, the deposit instruction is input through the operation portion of the wicket counter (tellers terminal) 11a. The operator then puts the cash received from the customer into the bill port 100 (FIG. 10) and the coin port 105 (FIG. 10) of the cash receiving machine 12, at step 503. The cash is discriminated and counted at step 504, and the bills are pooled in the bill pool portion (described later) and the coins are pooled in the coin pool portion (described later), at the step 505. The counted result is displayed on the display portion at the wicket counter 11 at step 506 and it is confirmed whetehr the result is correct, at step 507.

When the transaction is finished, the operator depresses a transaction finish button at step 508, so that the contents of transaction are printed on the bankbook or the slip inserted in the registering machine. Further, the bills and coins pooled in the bill pool portion and in the coin pool portion are accommodated in the bill or holding or accommodating portion and in the coin holding or accomodating portion, respectively.

Then, the system control apparatus 4 produces an instruction signal Si to open the bottom portion of the bill holding portion and the gate of the coin holding portion (described hereinafter), so that the cash held therein is loaded onto the carrier 3a, at step 509.

The tellers terminal 11 detects whether the loading is completed at step 510 and feeds data of the amount of loaded cash to the system controller 4. The system controller 4 then carried out processes such as totalling the deposited cash and storing the total in a memory, and then selects the associated tellers counter 1, in accordance with the amount of the money loaded on the carrier 3a. The system controller 4 then outputs a signal to the carriage controller 5 to close the cover (described hereinafter) of the carrier 3a.

At step 511, the system controller 4 makes sure that no other carrier 3a is waiting at the holding or accommodating station 7c and that the rail 3b of the carrier path is not in use, and then produces an instruction Sc to the carriage control apparatus 5 to drive the carrier 3a at the wicket counter 1, at step 512, so that the cash is carried from the wicket counter 1 to the holding station 7c, at step 513.

The carrier 3a arrives at the holding station 7c and is raised by the elevator, and deposits the bills and coins through the bill holding port and coin holding port. At step 514, the bills and coins are held in the bill holding box and coin holding box.

The cash held in the cash box 6 is added to the counter which counts the held amount in the cash box 6.

The cash is also held in the same manner as above even when deposited by issuing a deposit instruction from other wicket apparatuses 11.

As mentioned above, the cash deposited through a plurality of cash receiving machines 10a, 10b is held in one cash box 2.

This makes it possible for the system controller 4 to easily determine and administrate the held cash. When instructions for discrimination and counting are issued from a plurality of tellers terminals at the same time, the discrimination and counting operations can be carried out in paralle. Namely, only carriage and holding operations of the carriers are sequential in the present invention.

In the aforementioned embodiment, data for the amount of loaded cash is input to the system controller 4 from the tellers terminal 11 when the cash is loaded on the carrier 3a. Alternatively, it is also possible to input data for the amount of the loaded cash to the system controller 4 immediately after the tellers terminal 11 instructs the cash receiving machines 12 to load the cash on the carriers 3a. In this alternative, even if the electrical power source is cut off, the tellers terminals 11 are initialized during the loading of the cash on the carriers 3a, and thus the system controller 4 can continue to operate correctly.

In this way, according to the present invention, the control block for the conveyance of the carriage is separate from and independent of the control block for other operations such as the cash receiving and disbursing, and accordingly, the system can be simplified. Furthermore, since the cash discharging machine is common to the plurality of tellers terminals, the determination of the amount of transacted cash and the amount of cash in the cash box can be achieved at a location remote from the tellers counters.

FIGS. 6 and 7 are diagrams illustrating the detailed structure of an embodiment according to the present invention, wherein FIG. 6 is a schematic side view, and FIG. 7 is a top view. In these diagrams, the same portions as those of FIG. 1 are denoted by the same reference numerals, reference numeral 6a denotes a cash handling port in a cashier station, through which the cash on the carrier 3a can be taken out by hand or the cash can be placed on the carrier 3a by hand, and 6b denotes a cashier terminal which includes a display and a keyboard that will be manipulated by the teller at the time of calculation.

Reference numerals 7a, 7b, 7c, 7d, 7e, 7f, 7g, 7h, and 7i denote lift mechanisms (FIG. 9) which work to remove the carrier 3a from the rail 3c, lift the carrier 3a upwards, move the carrier 3a to the cash handling ports 10a, 10b, 10c, 10d, 6a, and to the discharge port of the cash receiving machine for the teller, then move the carrier 3a to the discharge ports of the cash discharge machines 2a, 2a', and to the holding port of the cash holding or accommodating machine 2b. Then, after the processing is finished, move the carrier 3a downwards to place it on the rail 3c. Reference numerals 10a, 10b, 10c, and 10d denote cash handling ports at wicket counters A, B, C, and D, and reference numerals 11a, 11b, 11c, and 11d denote teller terminals at those wicket counters, each of which has a display and a keyboard through which the data for receiving or disbursing the money can be input by the wicket teller. Reference numerals 12a, 12b denote cash receiving machines for tellers, which are explained in detail in FIG. 10, and into which the wicket tellers at the wicket counters A, B, C, and D put the cash received. Reference numerals 13a, 13b denote terminal writers which, when a customer inserts his bankbook thereinto, read the data (account number and the like) from the magnetic stripes, report the data to the control unit 4, record the amount treated, balance, and the like sent from the control unit 4 onto the bankbook or journal, and return the bankbook to the customer.

According to this structure, there are four counters A, B, C, and D that are equipped with cash handling ports 10a, 10b, 10c, and 10d and teller terminals 11a, 11b, 11c, and 11d. Each of the cash receiving machines 12a, 13b for tellers, and the terminal writers 13a, 13b is commonly used by the wickets on each side.

The cashier counter consists of the operational cash discharging machine 2a, a spare cash discharging machine 2a', a cash holding or accommodating machine 2b, and a cashier station (cash handling port 6a, cashier terminal 6b). A rail 3b is laid to the wicket counters A, B, C, and D, and the carrier 3a moves on the rail 3b between the cashier counter and the wicket counters A, B, C, and D to carry the cash.

Next, the structure of each of the above portions will be described below prior to explaining the operation of the structure shown in FIGS. 6 and 7.

Figure 8A:
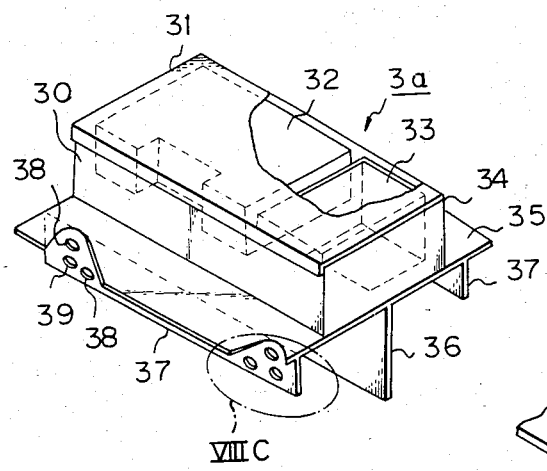
FIGS. 8A and 8B are perspective views showing in detail the structure of a carrier and a guide rail in the structure of FIG. 6.
Figure 8B:
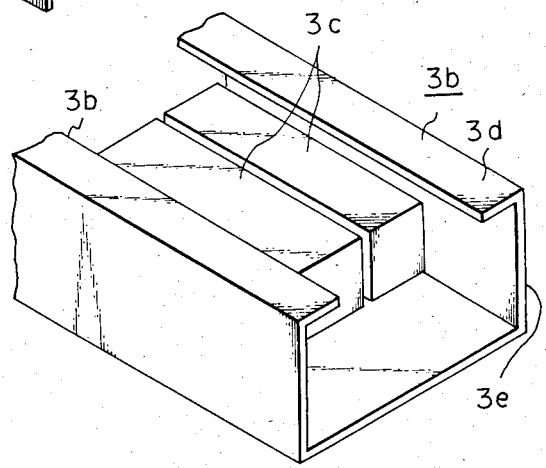
Figure 8C:
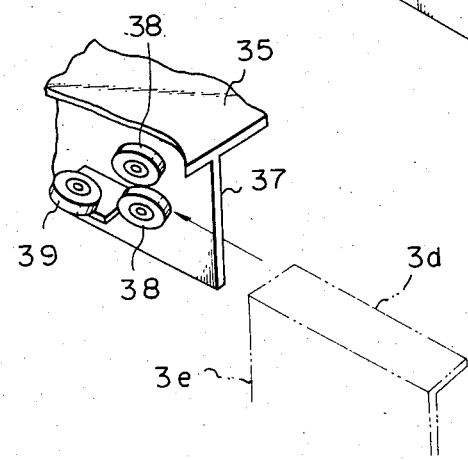
FIG. 8C is an enlarged perspective view of a circled portion designated at VIIIC, in FIG. 8A.

FIGS. 8A–8C are diagrams showing in detail the structure of the carrier means 3, wherein the diagram 8A shows the carrier 3a in detail, and in which reference numeral 30 denotes a vessel having a cover 31 that is supported by a hinge 34 so as to be opened. Reference numeral 32 denotes a bill container, and 33 denotes a coin container, each of which are designed to contain bills and coins, and are formed in the vessel 30. Reference numeral 35 denotes a base which supports the vessel 30 on the upper portion thereof, which has a rotor plate 36 at the lower central portion thereof, the rotor plate 36 corresponding to the rotor of a motor, and which has guide plates 37 at both lower sides thereof. Reference numerals 38, 39 denote guide rollers provided at the front and rear portions of the guide plates 37.

The diagram 8B shows the rail 3b in detail. The rail 3b is generally constructed in a generally inverted C-shape in cross section, and has upper guides 3d and side guides 3e. Reference numeral 3c denotes stators that are provided under the lower surface of the rail 3b, and on which the coils are wound to constitute a linear motor. The rotor plate 36 of the carrier 3a is placed between the pair of stators 3c. By permitting an electric current to flow into the coils, the carrier 3a is accelerated (or started), driven, or stopped (brake applied). The stators 3c are provided on the rail 3b at positions of lift mechanisms 7a to 7j (i.e., stations STa to STj) of FIG. 7, and at suitable positions between the station 7f and the station 7g.

FIG. 8c shows a diagram of the coupling between the carrier 3a and the rail 3b. As the carrier 3a is fitted to the rail 3b, the rotor plate 36 is positioned between the pair of stators 3c as mentioned earlier. In this case, the guide roller 39 of the guide plate 37 comes into contact with the inner surface of side guide 3e of the rail 3b to guide the carrier 3a in the lateral direction. At the same time, both sides of the upper guide 3d of the rail 3b are sandwiched by a pair of guide rollers 38 of the guide plate 37 to guide the carrier 3a in the up and down directions. Therefore, the carrier 3a movement is guided by the rail 3b.

Figure 9:
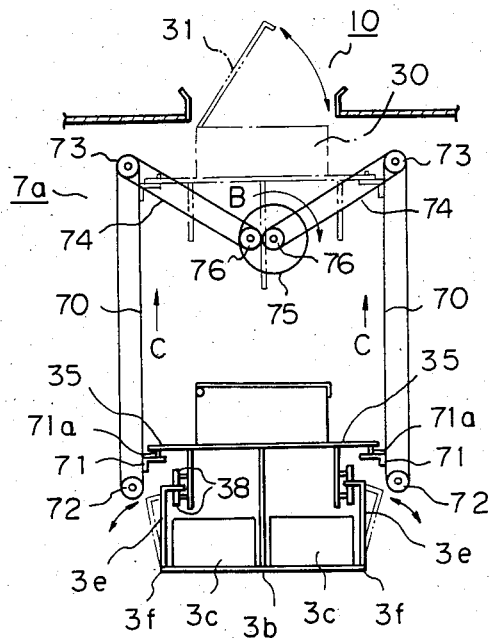
FIG. 9 is a diagram showing in detail the structure of a lift mechanism in the structure of FIG. 6.

FIG. 9 is a diagram showing the detail the structure of lift mechanisms 7a to 7j. Here, however, the lift mechanism 7a at the position of cash handling port 10a only is illustrated. Other lift mechanisms 7b to 7j are also constructed in the same manner. In FIG. 9, reference numeral 70 denotes a lift belt provided on both sides of the carrier 3a, and equipped with a bracket 71 having a pin 71a which engages with an engaging hole (not shown) formed in the base 35 of the carrier 3a. Reference numerals 72, 73 denote pulleys that rotate to drive the lift belts 70 in such a manner that the carrier 3a engaged with the pins 71a of the brackets 71 is moved in the upper and lower directions, and 75 denotes a motor which rotates the pulleys 76 to drive the lift belts 70. Rotation of the pulleys 76 is transmitted to the pulleys 73 through belts 74, to drive the lift belts 70. Reference numeral 3f denotes a hinge which is provided only at the positions of stations where the lift mechanism is provided. The hinge 3f works to turn the side guide 3e of the rail 3b to disengage the upper and side guides 3d, 3e of the rail 3b from the guide rollers 38, 39 of the carrier 3b; i.e., the carrier 3b is unlocked.

Therefore, the carrier 3a which runs on the rail 3b and which arrives at a desired station is stopped at a certain position by the braking force of the stator 3c at that station. Then, the lift belts 70 move upwards to some extent, so that the pins 71a of the brackets 71 engage with the base 35 of the carrier 3a. Further, the side guide 3e is turned by an unlocking mechanism (not shown) with the hinge 3f as a center, whereby the rail 3b is liberated, the carrier 3a is unlocked, and the lifting operation is carried out by the lift belts 70. Thereafter, the motor 75 runs to drive the lift belts 70, and the carrier is upwardly driven and is positioned under the cash handling port 10a. This position is a base position for the carrier 3a. In FIG. 7, six carriers 3a are provided, i.e., one carrier for each of the stations STa to STf. When not in use, the carriers wait at their base positions (correspond to refuge lines) in the stations.

After the lifting operation is finished, the rail 3b which is liberated is restored to the initial state, and is used for passing other carriers 3a. When the carrier 3a is to be used, the rail 3b is liberated, the carrier 3a is lowered by the lift belts 70 onto the rail 3b, which then restores the initial state, and guide rollers 38, 39 of the carrier 3a are engaged with upper and side guides 3d, 3e of the rail 3b. The lift belts 70 are further lowered to liberate the engagement between the pins 71a of the brackets 71 and engaging holes of the base 35, whereby the carrier 3a is liberated to run on the rail 3b.

Figure 10:
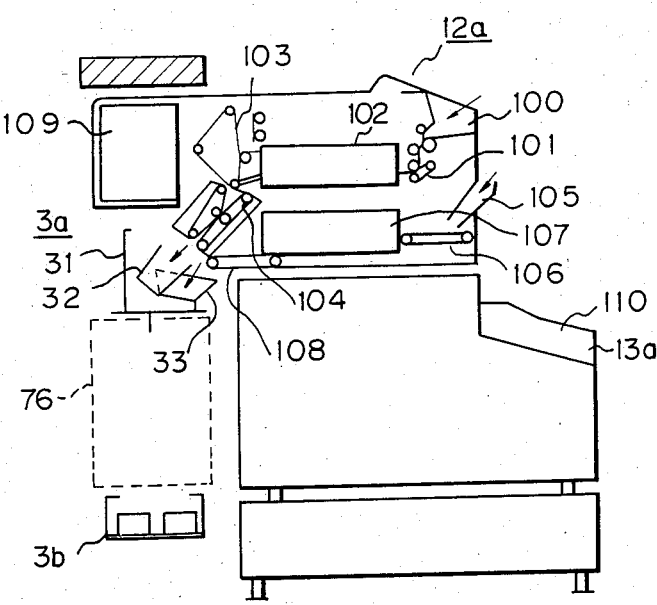
FIG. 10 is a diagram showing in detail the structure of a cash receiving machine for the teller in the structure of FIG. 6.

FIG. 10 is a diagram illustrating in detail the cash receiving machine 12a for the teller and the terminal writer 13a, wherein reference numeral 100 denotes a bill putting in port through which the bills are put that are received by the wicket teller from a customer, 101 denotes a bill separating portion which separates the bills put into the bill putting in port 100 into individual pieces and sends them to a bill discriminating portion 102. The bill discriminating portion 102 discriminates and counts the bills sent from the bill separating portion. A bill returning portion 103 then returns any bills discriminated by the bill discriminating portion 102 as counterfeit (impossible to discriminate), and also returns the bills in the primary pool upwardly. A bill discharging portion 104 having the primary pool at the upper position thereof to pool the bills discriminated as genuine bills, discharges the bills in the primary pool into the bill container 32 of the carrier 3a, which is at the base position. Reference numeral 105 denotes a coin putting in port into which are put the coins received by the wicket teller from a customer, 106 denotes a coin sending portion which sends the coins put in through the coin putting in port 105 to a coin discriminating portion 107. The coin discriminating portion 107 discriminates the coins sent by the coin sending portion, and a coin discharging portion 108 discahrges the coins discriminated by the coin discriminating portion 107 as genuine coins into the coin container 32 in the carrier 3a. The coins discriminated by the coin discriminating portion 107 as counterfeit are returned to a coin returning port via a coin guide. Reference numeral 110 denotes a bankbook/slip insert port through which the wicket teller inserts a bankbook or a slip received from a customer. The inserted bankbook or slip is sent to a registering machine where it is registered, and is then returned to the insert port 110. A control apparatus 109 is provided in the cash receiving machine to control the discriminating operation, pool operation, etc. in a well known manner.

Figure 11:
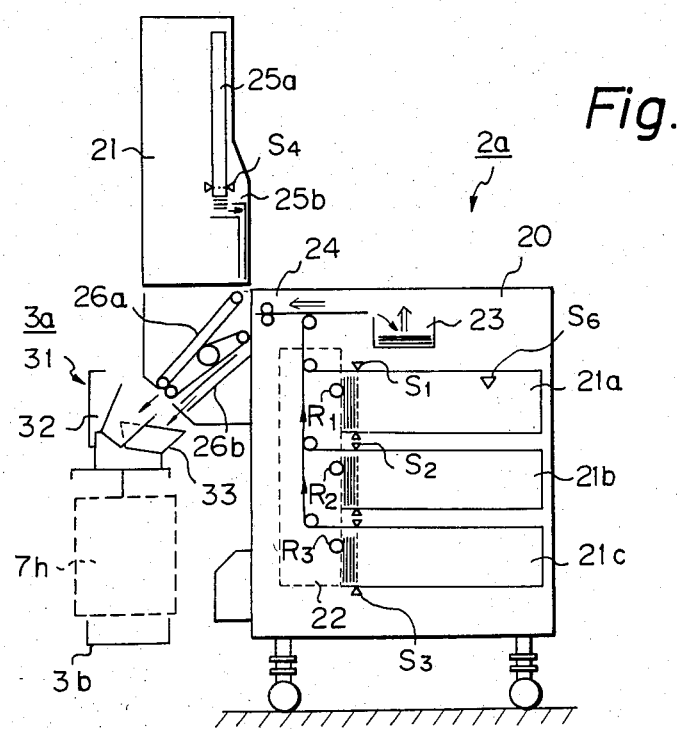
FIG. 11 is a diagram showing in detail the structure of a cash discharging machine in the structure of FIG. 6.

FIG. 11 is a diagram showing in detail the structure of the cash discharging machine 2a, which consists of a bill discharging portion 20 and a coin discharging portion 21. In FIG. 7, reference numerals 21a, 21b, and 21c denote bill holding portions (cash boxes) that receive, different denominations of bills, respectively, reference numeral 22 denotes a bill take-out portion which takes out bills to an instructed number of pieces and of an instructed amount from the bill holding or accommodating portions 21a, 21b, and 21c, reference numeral 23 denotes a primary pool which pools the bills taken out by the bill take-out portion 22, and 24 denotes a bill sending portion which sends the bills in the primary pool in batches to the bill discharging portion 20. Reference numeral 25a denotes a coin holding or accomodating portion (cash box) which holds the coins, 25b denotes a coin discharging portion in which coins to an instructed number of pieces and amount are taken out from the coin holding portion 25a and are once pooled, and then sends the coins to the coin discharging portion 21. Reference numeral 26a denotes a bill discharging portion where the bills sent by the bill sending portion are discharged into the bill container 32 of the carrier 3a raised by the lift mechanism 7h, and 26b denotes a coin discharging portion where the coins sent from the coin take-out portion 25b are guided and discharged into the coin container 33 in the carrier 3a.

In the vicinity of the terminal ends of the bill holding portions 21a, 21b, and 21c are provided sensors S1, S2, and S3, which detect the near ends of the bills and issue signals to the system controller 4. The bills are fed from the bill holding portions 20, 21 by means of rollers R1, R2, and R3, respectively. In the vicinity of the terminal end of the coin holding portion 25a is provided a sensor S4 which detects a near end of the coin discharged from the coin holding portion 25a by means of a coin discharging mechanism (not shown) well known per se.

Figure 12:
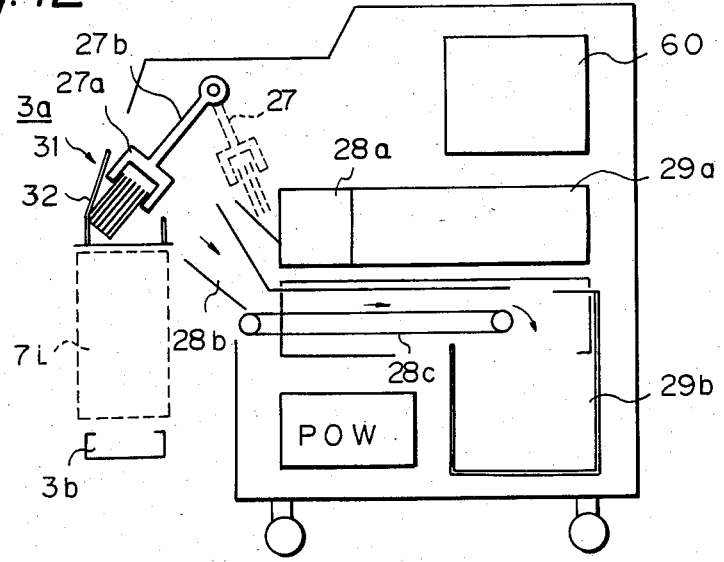
FIG. 12 is a diagram showing in detail the structure of a cash accommodating machine in the structure of FIG. 6.

FIG. 12 is a diagram showing in detail the structure of the cash holding (accommodating) machine 2b, wherein reference numeral 27 denotes a bill take-out robot having a hand 27a and an arm 27b. The bills in the bill container 32 of the carrier 3a are held by the hand 27a, and the arm 27b is turned to guide the bills held by the hand 27a to the putting in port of the bill discriminating portion 28a. The bill discriminating portion 28a discriminates the bills put in by the robot 27, and bill holding portion 29a (cash box) holds the bills discriminated as genuine bills by the bill discriminating portion 28a. The bills discriminated by the bill discriminating portion 28a as counterfeit are recovered in a reject box (not shown). Reference numeral 28b denotes a coin receiving portion which receives and guides the coins put in when the coin container 33 of the carrier 3a is tilted, 28c denotes a coin sending portion which sends the coins received by the coin receiving portion 28b to the coin holding portion 29a (cash box) which holds the coins sent from the coin sending portion 28c. The operations in the cash holding machine are controlled by a control apparatus 60.

Figure 13A:
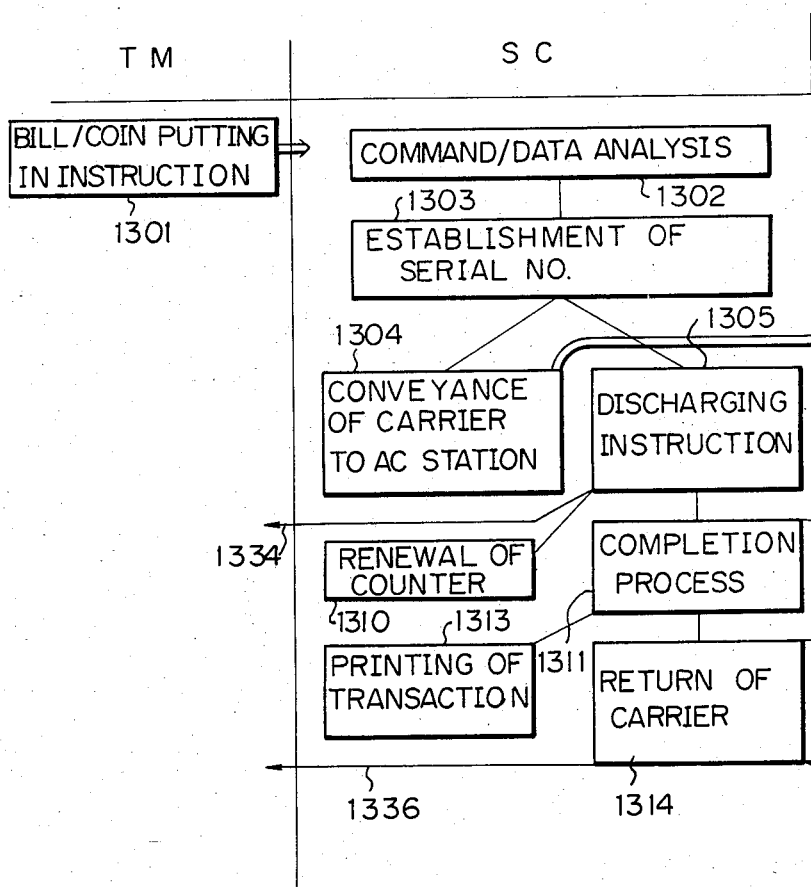
FIG. 13 (consisting of FIGS. 13A and 13B) is a flowchart of the operation for processing the disbursing of cash in the structure of FIG. 6.
Figure 13B:
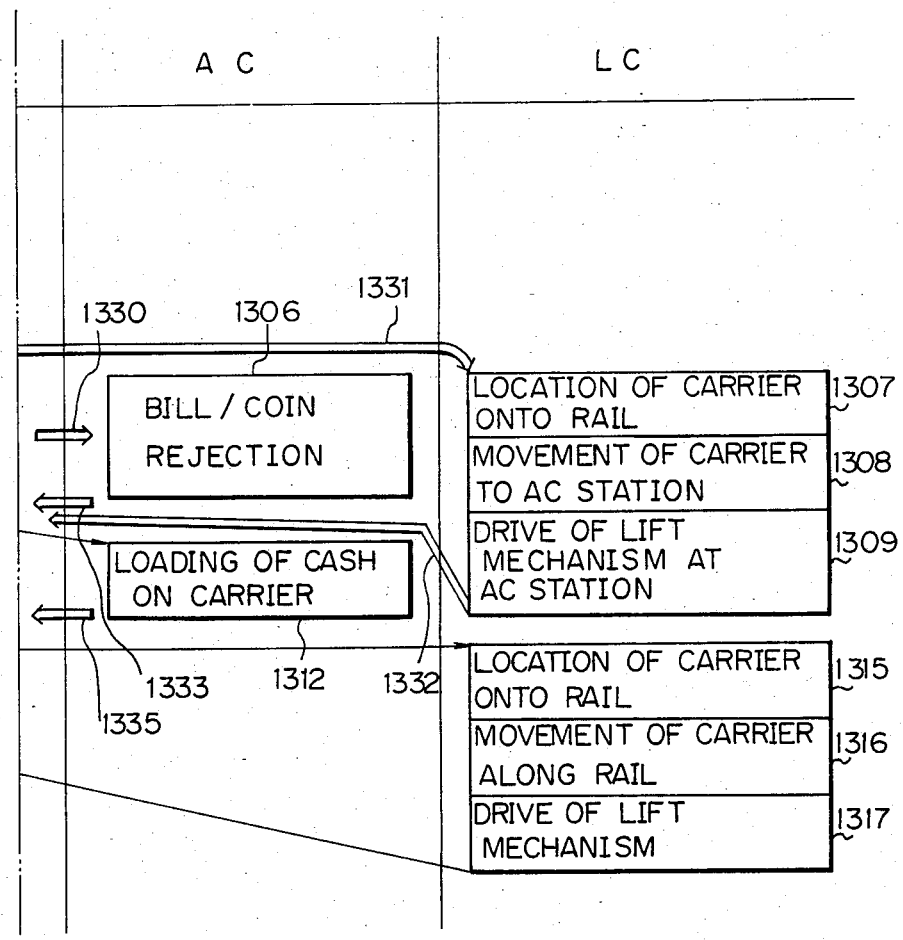
Figure 14B:
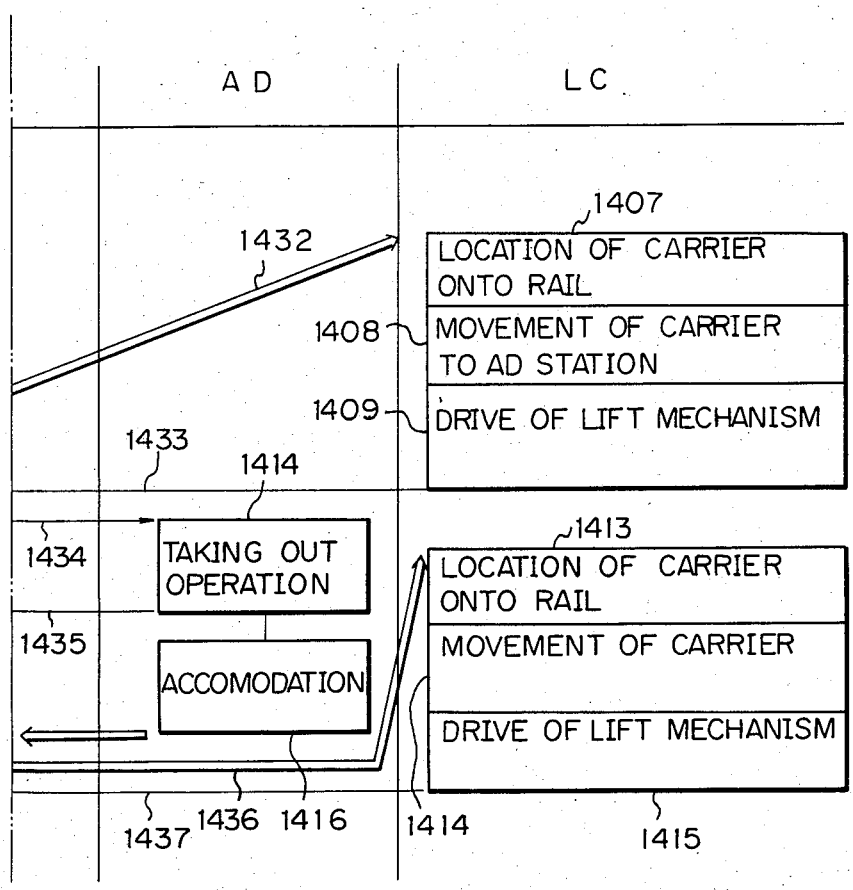
FIG. 14 (consisting of FIGS. 14A and 14B) is a flowchart of the operation for processing the cash receiving in the structure of FIG. 6.

Operation of the embodiment of FIGS. 6 and 7 will be described below in conjunction with a flowchart of the operation of the disbursement processing shown in FIG. 13 and a flowchart of the operation of the cash receiving processing shown in FIG. 14. Here, symbols STa, STb, STc, STd, STe, and STf represent wicket stations, each having a carrier 3a waiting at the base position, symbols STg, STh represent AC stations, STi represents an AD station, and STj represents a cashier station.

First, the operation of the disbursement processing of FIG. 13 will be described.

(1) At step 1301, the wicket teller receives a slip requesting cash disbursement and a bankbook from a customer, and inputs a bill/coin put in instruction consisting of a disbursement instruction and the amount to be disbursed through a teller terminal TM (e.g., 11a) at the wicket. The put in instruction is sent to the system control unit SC 4, which receives the contents of the magnetic stripes of the bankbook read when the bankbook is inserted by the wicket teller into the terminal writer (e.g., 13a). The system control unit 4 then determines (command/data analyzed) whether the transactions can be carried out by consulting the host computer, at step 1302. If the transactions are allowable, the control unit 4 establishes a serial number for the disbursement processing, at step 1303. This serial number is then used as a discrimination number, and the processing is carried out according to this number.

(2) The control unit 4 instructs the linear motor controller 5 to move the carrier 3a waiting at the wicket station (e.g., STa) to the AC station STh, at step 1304. For instance, the control unit 4 issues a drive instruction as shown by an arrow 1331, such that the wicket station STa becomes a departure station, and the AC station STh an arrival station. At the same time, the control unit 4 sends an instruction, as shown by an arrow 1330, to the cash discharging machine 2a (AC) to discharge the requested amount of money, at step 1305.

(3) Therefore, the linear motor controller 5 (4c) drives the lift mechanism 7a (FIG. 9) at the wicket station STa, in such a manner that the carrier 3a is lowered from the base position and is placed on the rail 3b, at step 1307. Then, the stator 3c at the wicket station STa is energized to start the carrier 3a. The linear motor controller 5 detects the position of the carrier 3a, relying upon outputs from the sensors $S_5$ (FIG. 7), maintaining it at a predetermined distance on the rail 3c and successively energizes the stators 3c at points where the carrier 3a moves on the rail 3b, at step 1308. Arrival of the carrier 3a at the AC station STh is detected by the output of the sensor $S_5$, whereby the stator 3c at the AC station STh is reversely energized to stop the carrier 3a at that position. The linear motor controller 5 then drives the lift mechanism 7h at the AC station STh to remove the carrier 3a from the rail 3b and to raise it, at step 1309. Thereafter, the linear motor controller 5 informs the control unit 4 of the completion of processing, as shown by an arrow 1332.

(4) Upon receipt of the instruction to discharge the money, the cash discharging machine AC initiates the discharging operation, at step 1306. That is, as illustrated with reference to FIG. 11, predetermined bills are taken out by the take-out portion 22 from the bill holding portions 21a, 21b, and 21c and are pooled in the primary pool 23. Similarly, the coins are taken out by the take-out portion 25b from the coin holding portion 25a and are pooled. After the bills and coins are taken out and counted, the control unit 4 is informed of the completion of the count, as shown by an arrow 1333.

(5) Upon receipt of completion of count and completion of processing signals, the control unit 4 detects the completion of loading preparation and outputs a signal (proper completion), as shown by an arrow 1334, to the teller terminal 11a, which displays this information to the wicket teller.

(6) Then, the control unit 4 renews the counter of the disbursement amount in the internal memory, at step 1310. At the same time, the completion processing is performed to load the cash on the carrier, at step 1311. That is, the control unit 4 sends a loading start instruction to the cash discharging machine AC. As the carrier 3a is raised by the lift mechanism 7h to the lower portion of the discharging portions 26a, 26b, the cover 31 is opened by a cover drive mechanism (not shown) as illustrated in FIG. 11, whereby the bill container 32 is so turned as to easily accept the bills. The coin container 33 is also tilted forward to easily accept the coins. Responsive to the loading start instruction, the cash discharging machine 2a drives the bill sending portion 24 and the bill discharging portion 26a so that the bills in the primary pool 23 are discharged and loaded onto the bill container 32 in the carrier 3a, at step 1312. Similarly, the coin take-out portion 25b is driven, so that the coins in the primary pool are sent to the coin discharging portion 26b, and are discharged and loaded onto the coin container 33, at step 1312. When the loading is finished, the completion is reported to the control unit 4, as shown by an arrow 1335.

(7) At step 1313, the control unit 4 controls the terminal writer 13a to register the bankbook inserted. The bankbook is then returned to the insert port 110.

(8) At the same time, the control unit 4 performs the processing to return the carrier, at step 1314. The control unit 4 issues to the linear motor controller (carriage controller) 5 a drive instruction such that the departure station is the AC station STh and the arrival station is the wicket station STa. Therefore, the linear motor controller 5 drives the lift mechanism 7h at the AC station STh. That is, the cover 31 of the carrier 3a is closed by the cover drive mechanism (not shown), and the carrier 3a is lowered to be placed on the rail 3b, at step 1315. Then, the linear motor controller 5 drives the stator 3c at the AC station STh to start the carrier 3a. In the same manner as mentioned above, the linear motor controller 5 successively drives the stators 3c at points where the carrier passes on the rail 3b; i.e., the carrier 3a runs along the rial 3b, at step 1316. As the carrier 3a arrives at the wicket station STa, the stator 3c at the wicket station STa is reversely excited to stop the carrier 3a at that position. Further, at step 1317, the linear motor controller 5 drives the lift mechanism 7a at the wicket station STa to remove the carrier 3a from the rail 3b, to raise it, and to return it to the base position. Then, the cover drive mechanism (not shown) of the lift mechanism 7a is driven to open the cover 31 of the carrier 3a.

The linear motor controller 5 reports the completion of the operation to the control unit 4 which then reports the completion of the operaton to the teller terminal 11a, as shown by an arrow 1336, where the completion of operation is displayed to the wicket teller. The wicket teller then takes out, through the cash handling port 10a, the bills and coins loaded on the bill container 32 and coin container 33 of the carrier 3a as shown in FIG. 9.

(9) The wicket teller then takes out the bankbook which has been registered from the insert port of the temrinal writer 13a, and hands it to the customer together with the cash, thereby completing the disbursing operation.

Described below is the processing for receiving cash in conjunction with FIG. 14.

(a) At step 1401, the wicket teller receives from a customer cash, a cash deposit slip, and a bankbook, and inputs the amount received to the control unit 4 through the teller terminal (e.g., 11a) at the wicket. The control unit (SC) 4 further receives the contents read from the magnetic stripes of the bankbook when the bankbook is inserted by the wicket teller into the terminal writer (e.g., 13a), and determines (command/data analysis) whether the transaction can be carried out by consulting the host computer, at step 1402. If the transaction is allowable, the control unit 4 employs a serial number for processing the money received, at step 1403. This serial number is then used as a discrimination number to execute the processing.

(b) Next, the control unit 4 issues a deposit notice to the teller terminal 11a, as shown by an arrow 1430, and registers the bankbook inserted in the terminal writer 13a, at step 1404. The wicket teller puts the cash received from the customer into the putting in ports 100, 105 (FIG. 10) of the cash receiving machine 12a. In the cash receiving machine 12a, as described with reference to FIG. 10, the bills and coins are discriminated by the discriminating portions 102, 107, counted, and pooled in the primary pools. Through the discrimination operation, the amount of cash put in is sent to the teller terminal 11a so that the wicket teller can confirm the amount of cash put in. If this amount displayed is in agreement with the amount to be deposited, the wicket teller inputs an approval signal through the teller terminal 11a. Then, the cash in the primary pool is discharged through the discharge portion 104 into the bill container 32 and coin container 33 of the carrier 3a that is waiting with its cover 31 open, and the loading of cash is completed, at step 1405. The completion of loading is informed to the control unit 4, as shown by an arrow 1431.

(c) Upon receipt of the loading completion information, the control unit 4 instructs the linear motor controller (LC) 5 to move the carrier 3a at the station STb of the wicket (CC) to the AD station STj, at step 1406. That is, the control unti 4 issues a drive instruction as shown by an arrow 1432, such that the departure station is CC station STb and the arrival station is AD station STi.

(d) The linear motor controller 5 so works that the cover 31 is closed by the cover drive mechanism (not shown) of the lift mechanism 7a at the CC station STb, and that the carrier 3a is lowered from the base position and is placed on the rail 3b, at step 1407. Next, the stator 3c at the CC station STb is energized to start the carrier 3a. The linear motor controller 5 detects the position of the carrier 3a, relying upon the outputs of sensors $S_5$ (FIG. 7) provided on the rail 3c, maintaining a predetermined distance, and successively energizes the stators 3c at points where the carrier 3a passes on the rail 3b, so that the carrier 3a runs along the rail 3b, at step 1408.

Arrival of the carrier 3a at the AD station STi is detected by the output of the sensor $S_5$, whereby the stator 3c at the AD station STi is reversely excited to stop the carrier 3a at that position. The linear motor controller 5 further drives the lift mechanism 7i at the AD station STi, so that the carrier 3a is removed from the rail 3b and is raised, at step 1409. The linear motor controller 5 then informs the control unit 4 of the completion of processing, as shown by an arrow 1433.

(e) Upon receipt of the completion of processing signal, the control unit 4 initiates the processing for holding, at step 1410. That is, the control unit 4 sends a taking instruction to the cash holding machine (AD) 2b, as shown by an arrow 1434. As the carrier 3a is raised by the lift mechanism 7i to a position under the robot 27, the cover 31 is opened by the cover drive mechanism (not shown) as illustrated in FIG. 12, whereby the bill container 32 is turned to easily accept the bills. The coin container 33 is also tilted forward to easily accept the coins. In the cash holding machine, as described with reference to FIG. 12, the robot 27 takes out the bills from the bill container 32 at step 1411 and puts them into the putting in port of the bill discriminating portion 28a. Similarly, the coin container 33 is tilted by a coin taking mechanism (not shown) so that the coins are put into the coin receiving portion 28b. After the taking operation is finished, at step 1412, the cash holding machine 2b informs the control unit 4 of the completion of the taking operation, as shown by an arrow 1435.

(f) As the taking operation is finished, the control unit 4 performs the processing to return the carrier, at step 1412. The control unit 4 issues to the linear motor controller 5, as shown by an arrow 1436, a drive instruction such taht the departure station is the AD station STi and the arrival station is the CC station STb. Therefore, the linear motor controller (LC) 5 drives the lift mechanism 7i at the AD station STi. Namely, the cover 31 of the carrier 3a is closed by the cover drive mechanism (not shown) and the carrier 3a is lowered to be placed on the rail 3b, at step 1413. Then, the linear motor controller 5 energizes the stator 3c at the AD station STi to start the carrier 3a. In the same manner as mentioned above, the linear motor controller 5 successively energizes the stators 3c at points where the carrier passes on the rail 3; i.e., the carrier 3a runs along the rail 3b, at step 1414. As the carrier 3a arrives at the CC station STb, the stator 3c at the CC station STb is reversely excited to stop the carrier 3a there. The linear motor controller 5 then drives the lift mechanism 7b at the CC station STb, to remove the carrier 3a from the rail 3b, and to raise it to the base position, at step 1415. The cover drive mechanism (not shown) of the lift mechanism 7b is then driven to open the cover 31 of the carrier 3a. The linear motor controller 5 then informs the control unit 4 of the completion of the operation, as shown by an arrow 1437, which then informs the teller terminal 11a, as shown by an arrow 1438.

(g) Continuing with the taking operation mentioned above, the cash holding machine (AD) 2b operates the bill discriminating portion 28a to discriminate the bills at the putting in port and holds them in the holding portion 29a. Similarly, the coin sending portion 28c is driven, so that the coins put into the coin receiving portion 28b are held in the coin holding portion 29b, at step 1416.

The cash receiving operation is thus completed. During the above-mentioned cash receiving operation, tellers at other wickets may load the cash onto the carrier through the cash handling port.

The control unit 4 has a status memory 4a (FIG. 7) in its internal memory to sequentially store the operation conditions of each of the devices. When the power supply is interrupted, the data is placed in a nonvolatile memory together with other data of the transactions, and is read out when the power supply is restored. The status memory 4a stores the process modes (whether the cash is being received or disbursed) and the operation modes (whether the carrier is being moved, the cash is being loaded, being returned, being taken in, or being counted). Through communications with the linear motor controller 4, cash discharging machine 2a, and cash holding machine 2b described with reference to FIGS. 13 and 14, the control unit 4 detects and stores the current mode of operation.

Furthermore, the status memory 4a has an area for storing demand data (receipt and deposit instructions) issued from the tellers terminals 11a–11d, so that the demand data from the tellers terminals is stored in the order of the arrival of the demand, to make a queue of the processes of the cash receipt or cash payment.

During the operation of receiving or disbursing the cash, the money in the cash boxes 21a–21c decreases, or the cash boxes 21a–21c become full, both resulting in the necessity for an exchange of the cash boxes for empty ones. Thus, according to the present invention, the problem of exchanging the cash boxes is also solved.

Namely, assuming that the cash box 21a at the cash holding machine 2b is fully with money, the "full" condition is detected by a sensor S6 (FIG. 11).

The detection is displayed at the cashier terminal 6b, and the teller then pushes a button 66 (FIG. 7) provided on the keyboard of the cashier terminal 6b to temporarily hold or suspend the cash receiving operation.

The push button 66 sends a holding signal Sh to the system controller 4, so that the system controller 4 holds or suspends the cash receiving operation at the cash holding machine 2b. Namely, the system controller 4 keeps a normal routine sequence for interfaces between the system controller and the tellers terminals 11a–11d, but holds the actual cash receiving operation by using the cash holding machine 2b. In other words, the steps after (b) mentioned above among the steps (a)–(g) are held. If the processing of a cash receipt is demanded from the tellers terminal during the holding time the demand data is stored in the queue of the status memory 4a after only the aforementioned step (a) has been effected.

If the system controller 4 exercises the cash receiving operation when the push button 66 is actuated, the system controller holds the later demanded cash receiving operation after the first mentioned cash receiving operation is completed. The exchange of the cash box (taking out the cash box) for an empty one is impossible, until the holding operation is completed after the actuation of the push button 66, and this condition is displayed at the cashier terminal 4a. In the illustrated embodiment, the push button 66 has a lamp or the like (not shown) which intermittently lights when the push button 66 is pushed, so that the tellers can determine that the system is a holding status. After the holding status is settled, the lamp is kept ON, so that the tellers know that the exchange of the cash boxes is now possible.

It should be noted that when the demand of payment is issued from the tellers terminals during the holding state, the system controller 4 exercises the normal disbursing operations (1)–(8) mentioned above. Similarly, when a push button 67 on the keyboard of the cashier terminal 4a for holding the payment is pushed, the disbursing operation is temporarily held or suspended. During the holding of the disbursing operation, the cash receiving operation can be normally effected by the system controller 4.

When the exchange of the cash boxes is completed by a cashier operator, the cashier operator again pushes the push button having the lamp kept ON. Consequently, the system controller 4 cancels the holding of the cash receiving operation, and the system is returned to the initial position. As can be seen from the above discussion, according to the present invention, the cash receiving operation or cash disbursing operation can be temporarily held on the cahier temrinal side. This is particularly useful when the tellers terminals are located at positions remote from the cashier terminals, as in the illustrated embodiment of the invention. The exchange of the cash boxes can be effected without involving the tellers, and the demand data for the cash receipt or disbursement is easily controlled by the system controller.

During the cash receiving or disbursing operation, sometimes a clearance operation is necessary. For example, in a bank, the daily transactions are usually cleared at 3:00 pm and transactions before that time are treated as those of that day, and transactions thereafter, if any are treated as those of the next day. The clearance operation is mainly for confirmation of the amount of cash transacted in that day. In the clearance operation, an examination note is prepared in accordance with the contents of the cash counter and the result is compared with the cash in the cash boxes at the cash holding machine. The cash counter is then cleared, to make transactions after the clearance possible.

Figure 15:
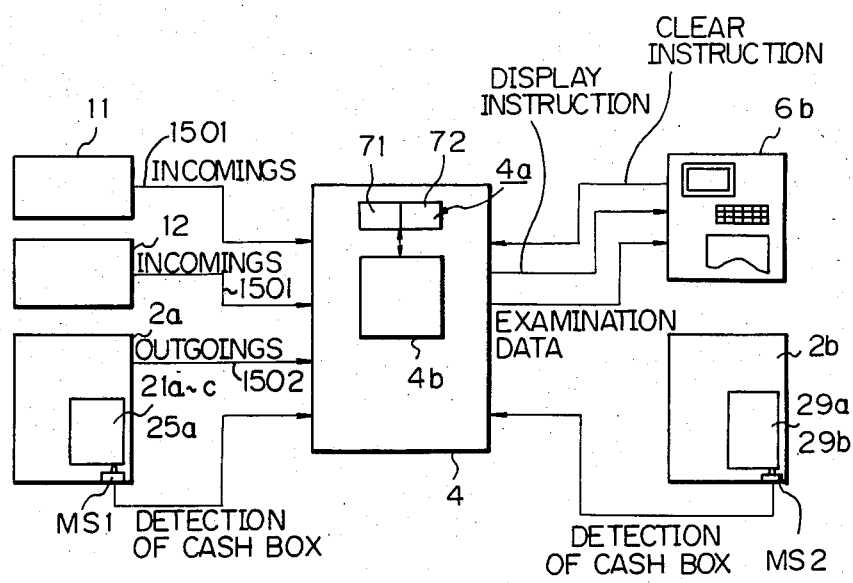
FIGS. 15 and 16 are a block diagram and a flowchart of an embodiment and operation for carrying out a clearance according to the present invention, respectively.

Therefore, if the clearance is demanded during the cash receiving or disbursing operation in which the cash exists somewhere on the system line the clearance may be effected before the cash is summed or counted or held in the safe, i.e., cash box, or before the cash is discharged, resulting in failure to correctly verify the cash amount, or an inconsistency between the data on the examination note and the cash in the cash boxes. These problems are also solved by the present invention. FIG. 15 is a schematic block diagram showing the arrangement for a clearance operation.

In FIG. 15, the elements corresponding to those in FIGS. 6 and 7 are designated by the corresponding reference numerals. In FIG. 15, 4b denotes a process circuit for carrying out the necessary processes of the control unit 4, and MS1 and MS2 are detection switches for detecting the presence of the cash boxes 21a, 21b, 21c, and 25a at the cash discharging machine 2a, and the cash boxes 29a and 29b at the cash holding machine 2b, respectively.

Figure 16:
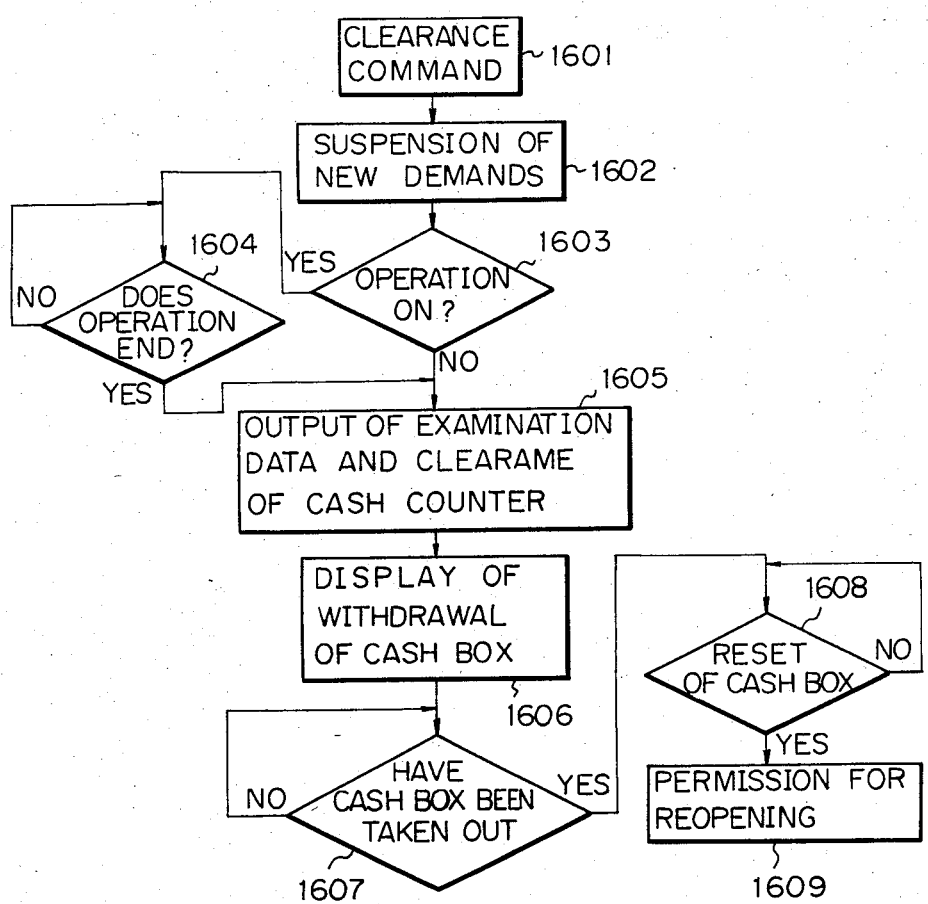

FIG. 16 is a flowchart showing the operation of the arrangement shown in FIG. 15.

First, the cashier teller pushes a clearing button 69 (FIG. 7) provided on the keyboard of the cashier terminal 6b and inserts a manager card into a card reader (not shown) so that the card reader reads the contents of the card. Then a finish button is pushed on the keyboard of the cashier terminal 6b to issue a clearance command to the system controller 4, at step 1601. The system controller 4 checks the content of the manager card to judge whether the clearance operation is properly demanded by a manager or administrator authorized make such a demand. After the card is checked, the clearing operation starts.

The control unit 4 suspends the receipt of a new process demand from the tellers machine counters and holds the demand in the queue, at step 1602. Then the system controller 4 judges whether the system line is under a cash receiving operation or cash disbursing operation condition, based on the contents of the money in the process status area, at step 1603. The progress of the operations in the courses of the cash receiving or cash disbursing operation is successively stored in the process status area memory. If the system line is under operation, the completion of the operation is waited, at step 1604. The completion of the operation may be either the completion of the return operation of the carrier 3a or the completion of the loading operation of the cash onto the carrier, or the completion of renewal of the cash counter, in the course of the cash disbursing operation shown in FIG. 13. In the course of the cash receiving operation shown in FIG. 14, the completion of the operation may be the completion of the returning operation of the carrier, the completion of the holding operation of the cash in the cash box, or the completion of the renewal of the cash counter.

When the answer at step 1603 is No, i.e., when the system line is not under operation, or when the completion of the operation is confirmed at step 1604, the system controller 4 obtains an examination data based on the contents of the cash counter 4a. The cash counter 4a has a deposit counter 71 which counts, sums and renews the amount of incomings 1501 from the tellers terminal 11 and the tellers cash receiving machine 12, as shown by arrows 1501 (FIG. 15), and a disbursement counter 72 which counts, sums and renews the amount of incomings from the cash discharging machine 2a, as shown by an arrow 1502. The number of each unit of paper currency and each unit of metal currency is stored in the cash counter 4a. Accordingly, the process circuit 4b obtains the examination data by editing the contents of the cash counter 4a into a predetermined format and outputs it to the cashier terminal 6b, at step 1605. The cashier terminal 6b prints and outputs the examination data to prepare the examination note. The contents printed on the examination note are the amounts of outgoings and incomings, the number of the paper currency and metal currency units which make up the details of these amounts, etc.

At the same time, at step 1605, the process circuit 4b clears the cash counter 4a.

After that, the process circuit 4b outputs a command for withdrawl (taking out) of the cash box to the cashier terminal 6b, and display this command at the cashier terminal 6b, to inform the cashier teller of the output of the instruction for the withdrawal of the cash box, at step 1606.

The following are the operations carried out to ensure the exchange of the cash box to reopen the system after a clearance. The system controller 4 reads the output of the detection switches MS1 and MS2 which detect the presence of the cash boxes in the cash discharging machine 2a and the cash holding machine 2b, respectively, to detect whether the cash boxes 21a, 21b, 21c, 25a, 29a, and 29b have been taken out, at step 1607.

The detection switches MS1 and MS2 are made OFF when the box has been taken out. When the system controller 4 detects that the detection switches are turned OFF and that the cash boxes have been taken out, the system controller detects at step 1608 that new cash boxes are inserted. Namely, the system controller 4 detects that the detection switches MS1, MS2 are made ON and then permits the system to reopen. In this way, even if the system must reopen immediately after the clearance operation ends, there is no possibility that the cash incoming after the closure of the system, for example, for the purpose of the clearance operation, is held in a cash box which has not been exchanged and which held the cash transacted before the clearance operation, or that cash transacted after the clearance operation is discharged from the cash box which has not been exchanged.

In the illustrated embodiments, the carriage means is not limited to the linear motor car and may be, for example, a conveyer belt, or the like.

I claim:
1. A cash processing system comprising:
   a transaction terminal having opening means for taking out and putting in cash, and means for demanding the payment or receipt of cash;
   a cashier terminal which is provided separately from the transaction terminal to effect the payment and receipt of the cash;
   passage means for connecting the transaction terminal and the cashier terminal;
   carriage means capable of moving along and on the passage means for conveying the cash between the terminals;
   a system controller for controlling the receipt and payment of the cash by the cashier terminal, in response to a demand from the transaction terminal; and,
   a conveyance controller for controlling the conveyance of the cash by the carriage means in accordance with outputs from the system controller.
2. A cash processing system comprising:
   a teller's window terminal having outlet opening for taking out cash and input means for inputting a demand including an amount of payment;
   a payment terminal having a cash box for receiving the cash, and means for feeding the cash from the cash box;
   passage means between the tellers window terminal and the payment terminal for connecting the terminals;
   carriage means capable of moving along and on the passage means for conveying the cash fed from the payment terminal to the tellers window terminal;
   a system controller for issuing a signal for feeding the cash to the payment terminal, in response to the demand from the teller's window terminal and for issuing a signal for movement of the carriage means which is located at the associated teller's window terminal to the payment terminal; and
   a conveyance controller for conveying the carriage means at the associated teller's window terminal to the payment terminal, in response to the outputs of the system controller;
   the conveyance of the movement of the carriage means between the teller's window terminal and the payment terminal being able to move abreast of the feed of the cash by the payment terminal.

3. A cash processing system according to claim 2, further comprising drive means for driving said carriage means and lifting means at the teller's window terminal for separating the carriage means from the passage means to bring it to said outlet opening.

4. A cash processing system according to claim 3, wherein said driving means comprises a linear motor.

5. A cash processing system according to claim 2, wherein said carriage means comprises a container for receiving metal currency and paper currency, and a top cover which can automatically open and close.

6. A cash processing system according to claim 2, wherein said teller's window terminal is provided at a teller's counter, and wherein said payment terminal is located remote from and behind the associated teller's counter.

7. A cash processing system according to claim 2, wherein said payment terminal comprises a cash box which separately receives metal currency and paper currency and means for automatically introducing the metal currency and the paper currency taken out from the cash box onto the carriage means, in accordance with output signal of the system controller.

8. A cash processing system comprising:
a teller's window terminal having a cash putting in opening, cash counting means for counting the cash which has been put in through the cash putting in opening, and loading means for automatically loading the cash counted by the counting means onto a carriage for conveying the cash;
a receiving terminal for receiving the cash loaded on the carriage;
a passage means between the teller's window terminal and the receiving terminal for the movement of the carriage;
a system controller for stopping the receipt transaction at the teller's window terminal, in response to the completion of loading of the cash onto the carriage at the teller's window terminal and for demanding the commencement of the movement of the carriage at the associated teller's window terminal; and
a conveyance controller for conveying the carriage at the teller's terminal to the receiving terminal, in response to the demand from the system controller.

9. A cash processing system according to claim 8, wherein said cash counting means comprises discriminating means for discriminating the genuineness and kind of money, put into the cash box, and rejecting means for rejecting currency which has been discriminated to be counterfeit.

10. A cash processing system according to claim 8, further comprising means for actuating said system controller and said conveyance controller independently of one another.

11. A cash processing system according to claim 8, wherein said system controller comprises a queue which stores information of the completion of the loading of the cash onto the carriage means from a plurality of teller's window terminals in the order of the receipt of the information, and control means for issuing signals for successive commencement of the conveyance of the carriage means at the teller's window terminals in response to the queue information.

12. A cash processing system according to claim 8, wherein said teller's window terminals comprise input means for inputting the amount of the incomings, proof means for proving the consistency between the input amount of the receipt and the result of the amount counted by said cash counting means, and permitting means for permitting the cash to be loaded on the carriage means when the data detected by the proof means is consistent.

13. A cash processing system comprising:
teller's window terminals for transacting the cash;
a cashier machine for payment and receipt of the cash;
carriage means for conveying the cash, comprising passage means extending between the teller's window terminals and the cashier machine, and carriages which move along and on the passage means to convey the cash;
a control apparatus for controlling the conveyance of the cash by means of the carriage means between the teller's window terminals and the cash machine, in accordance with the demands from the associated teller's window terminals;
and holding means separate from the teller's window terminals, for enabling the said control apparatus to temporarily hold the transaction of receipt and payment.

14. A cash processing system according to claim 13, further comprising a cashier machine provided behind the teller's window termianls and wherein said holding means is provided in the cashier machine.

15. A cash processing system according to claim 13, wherein said control apparatus comprises a system controller which issues signals for the conveyance of the carriages in response to the demands from the teller's window terminals, and a conveyance controller which controls the conveyance of the carriages in response to the signals of the system controller, said system controller comprising a queue area memory for storing the demand from the teller's window terminals in accordance with the signals for holding the conveyance, and means for holding the instructions of the conveyance to the conveyance controller.

16. A cash processing system comprising at least one teller's window terminal, an automatic cash transaction machine for receipt and payment of the cash at the teller's window terminal, conveying means for conveying the cash between the teller's window terminal and the cash transacting machine, a control apparatus for controlling the conveying means and the cash transaction machine and having a counter totaling the incomings and outgoings, instructing means for giving a clear signal to the control apparatus, clearance means for outputting data for printing an investigation note in accordance with the output of the counter, and means for causing the clearance means to print the investigation note in accordance with the output of the counter when the instructing means issues the clearance signal.

17. A cash processing system according to claim 16, further comprising a cashier machine behind the teller's window terminal, wherein said instructing means is provided on the cashier machine, and said clearance means comprises a printer for printing the output of the counter and is also provided in the cashier machine.

18. A cash processing system according to claim 16, wherein said teller's window terminal comprises input means for inputting the amount of payment or receipt, and wherein said control apparatus comprises a system controller for controlling the payment and receipt of the cash by the cash transaction machine, in accordance with the data of the amount of money input from the teller's window terminal.

19. A cash processing system according to claim 16, wherein said control apparatus comprises a queue area memory for storing the demands of receipt and payment from the teller's window terminal when the control apparatus receives the clearance signal, and holding means for holding the conveyance of the cash by the conveying means.

* * * * *